US005969012A

United States Patent [19]

Harris, Jr.

[11] Patent Number: 5,969,012

[45] Date of Patent: Oct. 19, 1999

[54] NON-AQUEOUS SLURRIES OF WATER SOLUBLE POLYMERS

[75] Inventor: William F. Harris, Jr., Ewing, N.J.

[73] Assignee: Rhodia Inc., Cranbury, N.J.

[21] Appl. No.: 08/865,020

[22] Filed: May 29, 1997

[51] Int. Cl.[6] ................................ C08L 1/02; C08L 1/08; C08L 1/26; C08L 5/00

[52] U.S. Cl. ................................ 524/55; 524/27; 524/28; 524/35; 524/43; 524/44; 524/45; 524/47; 524/52; 524/127; 524/145; 524/148; 524/377; 524/56

[58] Field of Search ................................ 524/47, 55, 44, 524/45, 127, 148, 27, 28, 35, 43, 52, 145, 377, 56

[56] References Cited

U.S. PATENT DOCUMENTS

| | | | |
|---|---|---|---|
| 4,176,107 | 11/1979 | Buckman et al. | 260/29.6 |
| 4,395,351 | 7/1983 | Camp | 252/315.1 |
| 4,453,979 | 6/1984 | DeMasi et al. | 106/188 |
| 4,566,977 | 1/1986 | Hatfield | 252/8.5 C |
| 4,799,962 | 1/1989 | Ahmed | 106/188 |
| 4,844,821 | 7/1989 | Mermelstein et al. | 252/8.7 |
| 4,867,888 | 9/1989 | Valone | 252/8.555 |
| 5,304,313 | 4/1994 | Berger | 252/3 |
| 5,336,316 | 8/1994 | Dawson et al. | 106/724 |
| 5,362,312 | 11/1994 | Skaggs et al. | 106/189 |
| 5,478,365 | 12/1995 | Nikanjam et al. | 44/280 |
| 5,487,777 | 1/1996 | Lundan et al. | 106/188 |
| 5,706,684 | 1/1998 | Gong et al. | 72/42 |

*Primary Examiner*—Judy M. Reddick
*Attorney, Agent, or Firm*—Andrew M. Solomon

[57] ABSTRACT

A non-aqueous slurry comprising (a) one or more water soluble polymers;

(b) polyalkylene glycol or thickened polyalkylene glycol; and a (c) a slurry stabilizer comprising an amine phosphate ester salt is provided. The slurry has a number of applications, including oil recovery, and in the paper and textile industries.

16 Claims, No Drawings

NON-AQUEOUS SLURRIES OF WATER SOLUBLE POLYMERS

BACKGROUND OF THE INVENTION

1. Field of the Invention

The present invention relates to stable non-aqueous slurries of water soluble polymers. More specifically, the slurries are characterized by having as their medium low molecular weight polyethylene glycol, and as a stabilizer, an amine phosphate ester salt.

2. Technology Description

Hydrophilic polymers or gums are widely used in industry. They are used to thicken, suspend or stabilize aqueous systems. These gums can produce gels or act as emulsion stabilizers, flocculants, binders, film formers, lubricants and friction reducers. In each of these applications, the polymers are used to adjust and control the rheological properties of the aqueous system to which they are being added.

For commercial and industrial applications, rapid addition of these gums to water is highly desirable. Doing so, however, often results in the formation of lumps of unhydrated polymer. These lumps are gel-like substances, wet on the outside but dry on the inside, that form as a result of the polymer beginning to hydrate before the polymer molecules are dispersed. Once the outer layer of polymer is hydrated, the lump or fisheye often cannot be dispersed even with vigorous mixing. Removal of these lumps results in significant losses of time, material and polymer efficiency.

These lumps are particularly problematic in the oil and gas industry where water soluble polymers are used downhole during drilling, workover, completion, stimulation and reservoir flooding operations. These unhydrated lumps, inert to enzymes, chemical breakers and acids, cause a variety of problems including plugging of the well and permeability impairment of the oil bearing strata. In addition, when polymers are used they are typically added to water in a dilute solution. During this operation fugitive dust is often generated. This dust has a number of potential detrimental effects. The dust can be inhaled by workers preparing the solution. Some of the polymers which can be suspended in a non-toxic solvent produce dust when handled in a powdered form which may produce a respiratory allergenic response and/or irritation to some individuals. Dust can also drift to areas where it is not intended.

To avoid lump or dust formation and its associated problems, the polymers can be added to the aqueous systems as liquid slurries. A number of methods for accomplishing this, and the compositions prepared thereby, are described in the prior art. Unlike the present invention, they often use oil carriers (e.g., mineral or diesel) to suspend and deliver the polymers to the aqueous systems. In addition to the oil carrier fluid, these slurries usually contain clay or clay like particulates which act to viscosity and stabilize the non-aqueous suspension. The disadvantages of these carrier systems is that attempts to eliminate the oil, often an undesirable component, result in the substitution of oil by toxic glycol ether. The clay component itself is also often times an undesirable component. This is particularly true in oil and gas field applications where incorporation of the clay into the slurries, which is necessary to keep the polymer in solution, impairs the permeability of the oil or gas bearing strata. This is the very problem caused by the formation of fisheyes that the oil slurry is supposed to eliminate.

U.S. Pat. No. 4,176,107 discloses liquid polymer compositions and to methods of preparing these compositions which comprise a high molecular weight water-soluble vinyl addition polymer, water, one or more surfactants, and a water-soluble polyalkylene glycol, or water-soluble ethoxylated alcohol, alkylphenol or fatty acid. U.S. Pat. No. 4,453,979 describes the use of water with a high molecular weight blend of water and polyethylene glycol to disperse hydrophilic gums. European Publication 58 017 describes the use of a water and clay based drilling fluid which contains high molecular weight PEG. PEG ranging in molecular weight from 1000 to 10,000,000, which are solid at room temperature, are mentioned. U.S. Pat. No. 4,799,962 discloses a particulate water-soluble polymer is dispersed in a liquid medium comprised of low molecular weight polyethylene glycol, water and high molecular weight polyethylene glycol in amounts sufficient to impart stability to the dispersion. U.S. Pat. No. 5,362,312 discloses a carrier for water-soluble polymers which includes polyethylene glycol; one or more viscosified polyol fluid components; and one or more viscosifying polysaccharides.

Despite the above teachings, there still exists a need in the art for liquid slurries for water-soluble polymers which are environmentally friendly, are extremely stable over long periods of time and are operative over a wide temperature range.

BRIEF SUMMARY OF THE INVENTION

In accordance with the present invention a novel non-aqueous slurry include one or more water-soluble polymers is provided. The slurry is environmentally friendly, extremely stable over long periods of time and operative over a wide temperature range.

In one embodiment, the invention comprises:

(a) one or more water soluble polymers;

(b) polyalkylene glycol or thickened polyalkylene glycol; and a (c) a slurry stabilizer comprising an amine phosphate ester salt.

In preferred embodiment, the water soluble polysaccharide comprises guar gum, xanthan gum, and derivatives thereof, the polyalkylene glycol is polyethylene glycol having a molecular weight of less than about 1000 and the stabilizer is the reaction product of poly(oxy-1-2-ethanediyl),α-9-octadecenyl-ω-hydroxy-(Z)-phosphate with 2-amino-2-methyl-1-propanol. The amount of polysaccharide in the slurry typically ranges from about 0.1 to about 50 percent by weight of the slurry.

The above slurry can be used for the following applications: environmental applications (e.g., remediation projects), paper applications, agricultural applications, textile applications and oil field applications.

Still another embodiment of the present invention comprises a slurry stabilizing composition comprising the reaction product of poly(oxy-1-2-ethanediyl),α-9-octadecenyl-ω-hydroxy-(Z)-phosphate with 2-amino-2-methyl-1-propanol.

An object of the present invention is to provide a non-aqueous slurry which is environmentally friendly, extremely stable over long periods of time and operative over a wide temperature range.

Still another object of the present invention is to provide an environmental chemical, agricultural chemical, paper chemical, textile chemical or oil field chemical which includes the novel slurry.

A further object of the present invention is to provide a novel chemical which has utility as a slurry stabilizer.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The first element of the slurry is the water-soluble polymer. The polymer is typically a polysaccharide and comprises between about 0.1 and about 50.0 percent by weight of the slurry, more preferably between 30 and about 50 by weight of the slurry and most preferably between about 40 and about 50 by weight of the slurry.

The polymer is a water dispersible or soluble hydrophilic polysaccharide preferably selected from the group consisting of xanthan gum, gellan gum, algin, locust bean gum, derivatized locust bean gum, carrageenan, guar gum, derivatized guar gum, cellulosics such as carboxymethyl cellulose, hydroxyethyl cellulose, methyl cellulose and polyanionic cellulose, succinoglucans, polyacrylamides, starch and starch derivatives. Mixtures of the above polymers are expressly contemplated as falling within the scope of the present invention.

Particularly preferred water-soluble polymers comprise xanthan gum, guar gum and guar gum derivatives. Derivatized polymers include one or more non-ionic, anionic or cationic groups. Examples of the types of functional groups involved in producing the derivatives include hydroxyalkyl groups, carboxyalkyl groups, quaternary ammonium groups, sulfonate groups, cyanoalkyl groups, phosphate groups, siloxane groups and the like having varying degrees of substitution and molecular substitution.

The resulting polygalactomannans may be multiple derivatives, such as double and triple derivatives having various degrees of substitution and molar substitution.

Specific examples of preferred derivatized polygalactomannans include hydroxypropyl guar gum; hydroxyethyl guar gum; 2-hydroxypropyl-trimethylammonium halide guar gum (quaternary ammonium cationic guar); 2-hydroxypropyl-dimethylalkylammonium halide guar gum (quaternary ammonium cationic guar, alkyl represents a long chain moiety having between 6 and 24 carbon atoms); 2-hydroxyethyl-dimethylalkylammonium halide guar gum (quatemary ammonium cationic guar, alkyl represents a long chain moiety having between 6 and 24 carbon atoms); carboxyethyl guar gum; carboxymethyl guar gum; carboxymethylhydroxypropyl guar gum; carboxymethylhydroxyethyl guar gum; and the like.

The second element in the slurry comprises polyalkylene glycol or thickened polyalkylene glycol. The amount of this component in the slurry ranges from about 40 to about 98.8 percent by weight of the slurry. Particularly preferred is the use of polyethylene glycol or polypropylene glycol. Even more preferred is the use of low molecular weight glycols having a molecular weight of less than 1000, more preferably between about 100–600 and most preferably between about 200–500. The use of polyethylene glycol having a molecular weight of about 200 can be used, for example.

The term "thickened polyalkylene glycol" refers to polyalkylene glycols preferably comprising between about 0.1–1.0% thickener selected from the group consisting of partially neutralized polyacrylic acid and hydroxypropyl cellulose, highly substituted hydroxypropyl guar, or their functional equivalents or mixtures thereof.

The third component of the slurry comprises an amine phosphate ester salt. This material is present in the amount of 0.1 to about 10.0 by weight of the slurry, more preferably in the amount of 1.0 to about 6.0 by weight of the slurry and most preferably in the amount of 2.0 to about 5.0 by weight of the slurry.

This component is the reaction product of an amine with a phosphate ester which has one or more hydrophobic groups. Examples of phosphate esters which may be selected as starting materials include phosphate esters of alkoxylated linear alcohols (ethoxylated and/or propoxylated) and phosphate esters of alkylphenols. A particularly preferred commercially available phosphate ester comprises poly(oxy-1-2-ethanediyl),α-9-octadecenyl-ω-hydroxy-(Z)-phosphate.

The amine which may be used is any amine which is capable of reacting with the phosphate ester to yield an amine salt of the ester. Examples of such amines include 2-amino-2-methyl-1-propanol, triethanol amine, diethanol amine and other mono, di and tri alkyl amines or amine alcohols with 2-amino-2-methyl-1-propanol being particularly preferred.

Production of the amine phosphate ester salt is obtained by adding the phosphate ester to a vessel containing a solvent, preferably the polyalkylene glycol which is used to form the slurry of the present invention. Thereafter, the amine is added to the vessel, preferably at ambient temperatures, or at a temperature not greater than about 90° C. and the contents are mixed under agitation until a uniform liquid mixture is obtained. The resulting mixture may be stored in a liquid form at ambient conditions.

In addition to the three components, the slurries of the present invention may include the following optional additive materials: proppants, antifoaming agents, surfactants, corrosion inhibitors, bactericides and the like.

To produce the slurry of the present invention, the three critical components and optional additives are simply mixed together. In a preferred synthesis procedure, the stabilizing amine phosphate ester salt is first prepared, preferably in a polyalkylene glycol solvent. If the amine phosphate ester salt is prepared in a solvent other than a polyalkylene glycol, it is isolated by means known in the art (e.g., filtration, crystallization, etc.) and thereafter mixed into the polyalkylene glycol.

Thereafter, the water-soluble polymer and optional additives are added to the polyalkylene glycol solvent containing amine phosphate ester salt stabilizer and the mixture is agitated for a time and agitation rate necessary to produce a uniform suspension. Such conditions should be sufficient to create and maintain a vortex in the reaction vessel at temperatures less than 90° C., preferably at ambient temperatures (i.e., 20–40° C.). The resulting suspension may be packaged and stored at ambient conditions.

The slurries of the present invention are extremely stable, whereby they maintain their stability under ambient storage conditions without the formation of lumps from the water-soluble polymer for over three months, more preferably over six months and most preferably over twelve months. In addition, the slurries may be used over a wide range of temperatures, with use ranges from about −20° C. to about 50° C. being considered as being within the scope of the present invention. Further, the slurries are considered environmentally friendly and are biodegradable.

The slurries of the present invention may be used in any number of commercial applications where dry water-soluble polymers have previously been used, as well as in applications where dry water-soluble polymers have not been well suited due to their slow dissolution rates. The slurries are particularly useful for applications involving dispersing the water-soluble polymers in aqueous solutions. Included amongst such applications are the following: environmental applications (e.g., remediation projects), paper applications, agricultural applications, textile applications and oil field applications.

Specific applications of the slurries of the present invention are as follows: In the paper industry, the slurries may be used as drainage and retention aids, in clarification of white water, as wet and dry strength resins, and as creeping aids.

In the textile industry, the slurries may be used in carpet printing and dyeing, where it is imperative that the water-soluble polymer not contain lumps when coating onto the fabric as such lumps can reduce the value of the carpet from first quality to second. The slurries may also be used as stabilizers for foamed backings for carpets.

In the petroleum industry, the water-soluble polymers of this invention can be used to lower the pumping friction, to raise the low shear viscosity to control fluid loss to the surrounding strata, and to push the oil to the pumping well. The polymers are also used in drilling muds, completion and work-over fluids, acidizing and fracturing fluids, in barrier fluids to control the water-oil ratio and in polymer flooding operations. The use of these polymers in flooding operations is becoming more important as the price of petroleum continues to increase and the availability continues to decrease. The use of these polymers behind a micellar fluid allows the petroleum producer to obtain a third crop of oil from the fields.

Other uses for the polymers of this invention include those where the products are utilized as thickeners and suspending agents in aqueous emulsions, such as water-thinned paints. Still other uses include hair sprays, gelatin substitutes for photographic applications, ceramics, cleaners, polishers, inks, fire-fighting chemicals, metal-working chemicals, components of adhesives and explosive formulations, binders for sand, ores, and coal.

The invention is described in greater detail by the following non-limiting examples.

EXAMPLE 1

(1) Preparation of Stabilizer

To 100 parts of polyethylene glycol (MW=200) at 25–50° C. are added 6.82 parts of poly(oxy-1-2-ethanediyl),α-9-octadecenyl-ω-hydroxy-(Z)-phosphate. The reaction vessel is agitated at 200 rpm at a temperature of 25–50° C. for 15 minutes. 0.91 parts of 2-amino-2-methyl-1-propanol are added and the vessel contents are mixed at 200 rpm at a temperature of 25–50° C. for 15 minutes to produce a uniform mixture. The resulting mixture contains about 7.73 percent by weight of the mixture of the 2-amino-2-methyl-1-propanol salt of poly(oxy-1-2-ethanediyl),α-9-octadecenyl-ω-hydroxy-(Z)-phosphate.

(2) Preparation of Slurry 71.8 parts of xanthan gum are added to the mixture including 7.73 parts stabilizing agent and 100 parts polyethylene glycol (MW=200). The reaction vessel is agitated at 650 rpm at a temperature of 25° C. for 60 minutes until a uniform suspension is obtained. The resulting mixture contains about 45.0 percent by weight of the suspension of xanthan gum. The viscosity of the liquid is 8000 cps as measured by a Brookfield RVF Viscometer, Spindle #4, 20 rpm. The slurry remains a stable liquid at storage temperatures as low as --20°C., and as high as 50° C. and for storage periods exceeding one year.

This slurry may be used in the applications as previously discussed in this application, and more specifically, by distribution into an aqueous environment. The xanthan gum will be distributed throughout the aqueous environment in a continuous form without the formation of lumps. By comparison, if xanthan powder alone is added to an aqueous environment in solid form, many lumps will form and the resulting suspension will not be continuous. Accordingly, the utilization of the inventive liquid non-aqueous slurry can be more beneficial for distribution of the xanthan into an aqueous environment as compared to a method which distributes the xanthan gum in solid, powder form.

Having described the invention in detail and by reference to the preferred embodiments thereof, it will be apparent that modifications and variations are possible without departing from the scope of the appended claims.

What is claimed is:

1. A non-aqueous slurry comprising:

(a) one or more water soluble polymers selected from the group consisting of xanthan gum, gellan gum, algin, locust bean gum, derivatized locust bean gum, carrageenan, guar gum, derivatized quar gum, cellulosic materials, succinoglucans, polyacrylamides, starch, and starch derivatives;

(b) polyalkylene glycol; and a (c) a slurry stabilizer comprising an amine phosphate ester salt.

2. The slurry according to claim 1 wherein said water soluble polymer is xanthan gum.

3. The slurry according to claim 1 wherein said polyalkylene glycol is selected from the group consisting of polyethylene glycol, polypropylene glycol, and mixtures thereof.

4. The slurry according to claim 1 wherein said amine phosphate ester salt is the reaction product of an amine with a phosphate ester which has one or more hydrophobic groups.

5. The slurry according to claim 4 wherein said phosphate ester is selected from the group consisting of phosphate esters of alkoxylated linear alcohols and phosphate esters of alkylphenols.

6. The slurry according to claim 5 wherein said phosphate ester is poly(oxy-1-2-ethanediyl),α-9-octadecenyl-ω-hydroxy-(Z)-phosphate.

7. The slurry according to claim 4 wherein said amine is selected from the group consisting of 2-amino-2-methyl-1-propanol, triethanol amine and diethanol amine.

8. The slurry according to claim 6 wherein said amine comprises 2-amino-2-methyl-1-propanol.

9. The slurry according to claim 1 wherein the amount of component (c) present comprises between about 0.1 and about 10.0 percent by weight of the slurry.

10. The slurry according to claim 1 further comprising one or more of the following additive materials selected from the group consisting of proppants, antifoaming agents, surfactants, corrosion inhibitors, and bactericides.

11. A non-aqueous slurry consisting essentially of:

(a) about 0.1 to about 50.0 percent by weight xanthan gum;

(b) about 40 to about 98.8 percent by weight polyethylene glycol; and (c) about 0.1 to about 10.0 percent by weight of the reaction product of 2-amino-2-methyl-1-propanol with poly(oxy-1-2-ethanediyl),α-9-octadecenyl-ω-hydroxy-(Z)-phosphate; wherein the sum of the weight percentages of (a), (b) and (c) is 100 percent.

12. A composition comprising environmental chemical, agricultural chemical, paper chemical, textile chemical, paint, hair spray, gelatin substitute, ceramic material, cleaning composition, polish, ink, fire-fighting chemical, metal-working chemical, adhesive chemical, explosive chemical, binder chemical for sand, ores or coal or oil field chemical which includes a non-aqueous slurry comprising:

(a) one or more water soluble polymers selected from the grout consisting of xanthan gum, gellan gum, algin, locust bean gum, derivatized locust bean gum, carrageenan, quar gum, derivatized quar gum, cellulosic materials, succinoglucans, polyacrylamides, starch, and starch derivatives;

(b) polyalkylene glycol; and a (c) a slurry stabilizer comprising an amine phosphate ester salt.

13. The composition according to claim 12 wherein said non-aqueous slurry comprises:

(a) about 0.1 to about 50.0 percent by weight xanthan gum;

(b) about 40 to about 98.8 percent by weight polyethylene glycol; and (c) about 0.1 to about 10.0 percent by weight of the reaction product of 2-amino-2-methyl-1-propanol with poly(oxy-1-2-ethanediyl),α-9-octadecenyl-ω-hydroxy-(Z)-phosphate; wherein the sum of the weight percentages for (a), (b) and (c) is 100 percent.

14. The composition according to claim 13 further comprising one or more of the following additive materials selected from the group consisting of proppants, antifoaming agents, surfactants, corrosion inhibitors, and bactericides.

15. The slurry according to claim 1 wherein said polyalkylene glycol further comprises between about 0.1 and to 1.0% by weight of said polyalkylene glycol of a thickener selected from the group consisting of partially neutralized polyacrylic acid, hydroxypropyl cellulose and mixtures thereof.

16. The composition according to claim 12 wherein said polyalkylene glycol further comprises between about 0.1 and to 1.0% by weight of said polyalkylene glycol of a thickener selected from the group consisting of partially neutralized polyacrylic acid, hydroxypropyl cellulose and mixtures thereof.

* * * * *